Patented Feb. 6, 1940

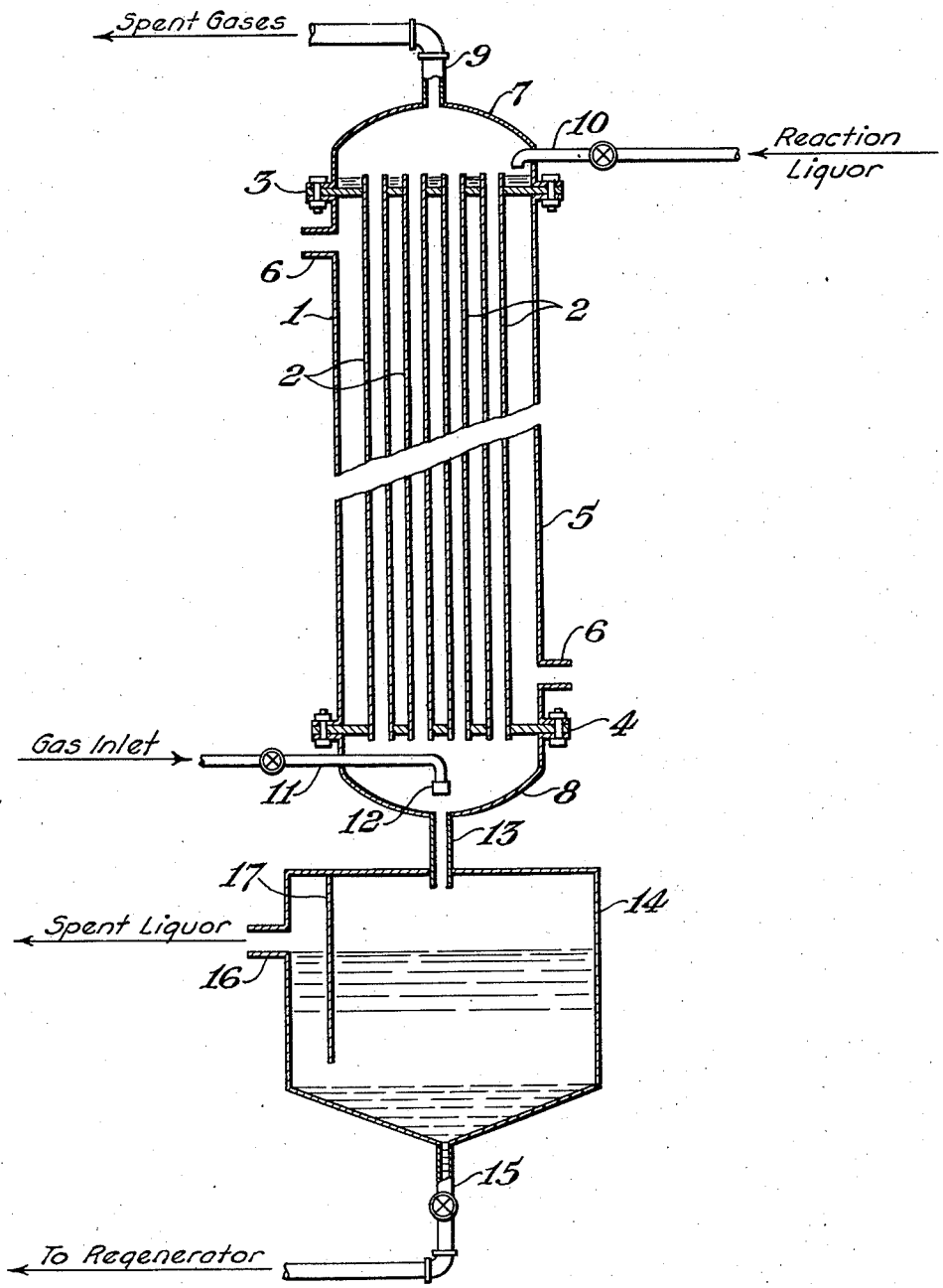

2,189,173

UNITED STATES PATENT OFFICE 2,189,173

RECOVERY OF GASEOUS DIOLEFINS

George M. Hebbard and Lewis E. Lloyd, Midland, Mich., assignors to The Dow Chemical Company, Midland, Mich., a corporation of Michigan Application July 9, 1938, Serial No. 218,463

2 Claims. (Cl. 260—680)

The present invention relates to an improved method of separating diolefins from gaseous hydrocarbon mixtures. More particularly it concerns a method of recovering butadiene from gases which also contain butylene.

It is known that both mono-olefins and diolefins will react at ordinary temperatures with salts of the heavy metals of groups I and II of the periodic system, particularly with cuprous chloride, to form complex addition compounds from which the olefins can be recovered by heating. It is also known that when this reaction is carried out in an aqueous medium under suitable conditions, the insoluble diolefin-metal salt addition compound precipitates, whereas the mono-olefin addition compound remains dissolved.

With these facts as a basis, a number of processes for separating diolefins from hydrocarbon gases which also contain mono-olefins have been suggested in the prior art. In general, such processes comprise contacting the hydrocarbon gas with an aqueous solution or suspension of a heavy metal salt of the type mentioned above, whereby the diolefin forms an insoluble addition compound, separating this insoluble complex, and heating the same to regenerate the diolefin. Such prior art processes have not, however, met with general acceptance, not only because of inherent operating difficulties, but also because a substantial proportion of the diolefin present in the hydrocarbon gas escapes without reacting, or the diolefin recovered is not pure, its concentration rarely exceeding 90 per cent.

We have now found that the manner in which the gaseous hydrocarbon mixture is contacted with the aqueous solution of the heavy metal salt exerts a pronounced effect on the efficiency and economy of the diolefin recovery. We have also discovered that the rate of precipitation of the insoluble diolefin-metal salt addition compound and the mode of formation of the crystalline particles thereof are likewise important to the success of the process. For example, if a mixture of butadiene and butylene is bubbled into any substantial body of the metal-salt reaction liquor, the butadiene reacts so rapidly that the insoluble addition compound which forms is a curdy, froth-like precipitate, and tends to float on the liquor, thus making satisfactory separation of the precipitate difficult. The curdy material formed contains a substantial proportion of butylene, either directly adsorbed to or included within the mass of the precipitate, so that the efficiency of the butadiene-butylene separation is thereby seriously impaired. On the other hand, if a gaseous mixture of butylene and butadiene is passed counter-current to the metal-salt liquor in an absorption tower of usual design, e. g. a bubble-tower, the insoluble addition compound tends to plug the tower, and continuous operation is impossible. These and other difficulties are inherent in the prior art processes for separating diolefins from hydrocarbon mixtures.

An object of the present invention is to provide for a more complete separation of diolefins from hydrocarbon gases, and their recovery in a higher degree of purity. Another object is to devise a simple and effective method of contacting the hydrocarbon gas with the metal-salt reaction liquor, wherein the rate of formation of the diolefin addition compound is controlled and the compound is obtained as a crystalline precipitate which may easily be separated from the reaction liquor and is free of included mono-olefins. Other objects will be apparent from the following description.

We have discovered that, when the gaseous hydrocarbon mixture is contacted with the reaction liquor in the form of a continuous flowing film, the diolefin-metal salt is formed as an easily separable crystalline precipitate substantially free of mono-olefins, and the efficiency and economy of the recovery process are markedly increased. The invention, then, consists in the improved process hereinafter fully described and particularly pointed out in the claims, the following description setting forth but several of the ways in which the principle of the invention may be employed.

For purpose of illustration the process will be described with reference to the separation of butadiene from a gaseous hydrocarbon mixture also containing butylenes, using a reaction liquor comprising cuprous chloride as the absorbing medium. However, the process is generally applicable to the separation and recovery of gaseous diolefins, using an aqueous solution of a salt of a heavy metal of groups I and II of the periodic system as the reaction liquor.

The accompanying drawing is a diagrammatic representation of one arrangement of apparatus adapted to carrying out the process of our invention, showing the flow of materials therein.

The gases are brought into contact with the absorption liquor in a tubular reactor 1. Reactor 1 is composed of a bundle of vertical tubes 2 mounted between upper and lower tube sheets 3 and 4, and enclosed by a shell 5 in which are inlet and outlet connections 6, 6 for circulation of cooling fluid. The ends of the reactor are formed by an upper head 7, and a lower head 8. In the upper head 7 is a gas exit pipe 9 and a valved inlet pipe 10 for introducing reaction liquor. The upper ends of the tubes 2 project above the tube sheet 3 in head 7. In the lower head 8 are valved gas inlet pipe 11, provided with a distributor head 12, and a drain pipe 13. This drain 13 leads to a separator tank 14, having a valved bottom outlet 15 and an overflow pipe 16 near the top, which is sealed off by a baffle 17.

In operation, the cuprous chloride reaction liquor, which preferably has been cooled to a temperature below 15° C., is fed continuously through the inlet 10 onto the upper tube sheet 3, from which it overflows into the tubes 2, and runs down the walls of the tubes as a continuous thin film wetting the entire surface. The hydrocarbon gas is introduced by way of the distributor 12 and rises through the tubes counter-current to the descending film of reaction liquor. The butadiene present in the gas reacts with the cuprous chloride in the absorbing liquor to form an insoluble crystalline precipitate which settles to the bottom of the separating tank 14. The inert gases and most of the butylene in the hydrocarbon mixture are unaffected by contact with the absorbing liquor and rise into the head 7 from which they may be drawn off through the outlet 9. The butadiene-cuprous chloride precipitate may be removed from the separator through the bottom outlet 15 and heated, e. g. to a temperature of 55°–65° C., in accordance with known procedure to regenerate the butadiene in a substantially pure state. The partially spent liquor in the upper part of the separating tank, from which the precipitate has settled, overflows continually through the outlet 16 and may be re-used in the process.

An essential feature of our process is that the reaction between the diolefin and the absorbing solution takes place when the latter is in the form of a continuous flowing film. In the preferred form hereinbefore described, the apparatus is so designed and controlled that little if any spray, bubbles, or slugs of liquid occur in the tubes, and substantially all the liquor flows as a thin film down the tube walls, which are uniformly wetted. The tube walls should present a smooth unbroken surface, free of joints or other irregularities which would tend to affect the formation of a crystalline addition compound. In order to provide a satisfactory contact between the ascending gas and the descending liquid film it is desirable that the length of the tubes be very great in comparison to their diameter, e. g. several hundred times the diameter. It is also preferable to operate at a relatively low gas velocity so that the surface of the tubes is not blown dry at any point and so that the butadiene in the gas has sufficient time to react with the absorbing solution. For example, in an apparatus constructed of 0.8 inch inside diameter tubes 20 feet long, a gas velocity of 10 feet per minute has been found suitable when treating a gas containing about 50 per cent butadiene.

In our process the rate of reaction is dependent on the rate at which the diolefin diffuses to the gas-liquid interface and dissolves in the reaction liquor and also upon the relatively slow rate at which the crystalline particles of the precipitate grow. Further, the reaction liquor, being in film form, presents a large surface to the gaseous hydrocarbon mixture, and localized high concentrations of the gas in the liquor are thus avoided. For these reasons the prior art difficulties occasioned by too high a rate of reaction, as hereinbefore mentioned, do not arise. In addition, because the absorbing solution is spread over a large surface, the heat of reaction is dissipated through the tube walls very rapidly, and local overheating at the zone of reaction does not occur.

Another advantage of our process is that the diolefin-metal salt addition product is formed as an easily separable crystalline precipitate substantially free of mono-olefin. This effect is readily seen, for example, by considering the reaction conditions at various points in the apparatus illustrated. In the upper portion of the tubes fresh reaction liquor is contacted by a nearly exhausted gas; the small quantity of diolefin in this gas dissolves slowly in the liquor and reacts to form the insoluble addition compound; because of the dilution, however, only a relatively small number of crystal nuclei of the compound are formed. At lower points in the tube also the diolefin precipitates as a metal-salt addition compound, but, under the conditions here obtaining, the minute particles of the complex formed, rather than combining into a froth-like precipitate, add to or coalesce with the crystal nuclei already present. That is, because local high concentrations of diolefin are avoided, relatively few new crystals are formed in the lower portion of the reaction tube, and this area serves as a zone in which the diolefin-complex being formed contributes to the slow growth of crystals already present; inclusion of mono-olefins does not occur. Thus in our process the crystals of diolefin addition compound form and grow under conditions most favorable to the satisfactory separation and recovery of the diolefin in a pure state, and the difficulties encountered in operating prior art processes are avoided.

The following example illustrates one way in which the principles of the invention has been employed, but is not to be construed as limiting the scope thereof:

*Example*

By operating continuously in accordance with the process hereinbefore disclosed, butadiene was recovered from a hydrocarbon gas derived from the pyrolysis of fuel oil and having the following approximate composition in parts by volume:

| | |
|---|---|
| Butadiene | 40 |
| Butylenes | 50 |
| Other unsaturates | 8 |
| Inert gases | 2 |

The reaction liquor employed was a solution containing 10 parts by weight of cuprous chloride, 20 parts of ammonium chloride, 1 part of stannous chloride, and 100 parts of water. The liquor was cooled to a temperature of −4° C. and circulated through a tubular reactor, as hereinbefore described, at the rate of 2.4 gallons per hour and the hydrocarbon gas was introduced at the rate of 2.3 cubic feet per hour. The insoluble butadiene-cuprous chloride addition compound formed as a coarse-grained crystalline precipitate which was easily separated from the reaction liquor. The precipitate was then heated at a temperature of 60° C., butadiene of 99 per cent purity being recovered at the rate of 0.9 cubic foot per hour.

Other modes of applying the principle of our invention may be employed instead of the one described, change being made as regards the details hereinbefore set forth, provided the step or steps recited by any of the following claims or the equivalent of such stated step or steps be employed.

We claim:

1. In a process for separating diolefins from gaseous hydrocarbon mixtures also containing mono-olefins, wherein a hydrocarbon mixture is contacted with a reaction liquor comprising a salt of a heavy metal of groups I and II of the periodic system to form an insoluble diolefin metal-salt addition compound from which the diolefin is subsequently recovered, the improvement which comprises disposing the reaction liquor as an unbroken continuous film on the inner walls of a substantially vertical reaction tube free of joints and surface irregularities and causing said film to flow downwardly countercurrent to an ascending stream of the gaseous hydrocarbon mixture.

2. In a process for separating butadiene from gaseous hydrocarbon mixtures also containing butylene, wherein the hydrocarbon mixture is contacted with a reaction liquor comprising cuprous chloride to form an insoluble butadiene cuprous chloride addition compound from which the butadiene is subsequently recovered, the improvement which comprises disposing the reaction liquor as an unbroken continuous film on the inner walls of a substantially vertical reaction tube free of joints and surface irregularities and causing said film to flow downwardly countercurrent to an ascending stream of the gaseous hydrocarbon mixture.

GEORGE M. HEBBARD.
LEWIS E. LLOYD.